(No Model.)
D. GOODWILLIE.
EGG CARRIER.
No. 266,619. Patented Oct. 31, 1882.
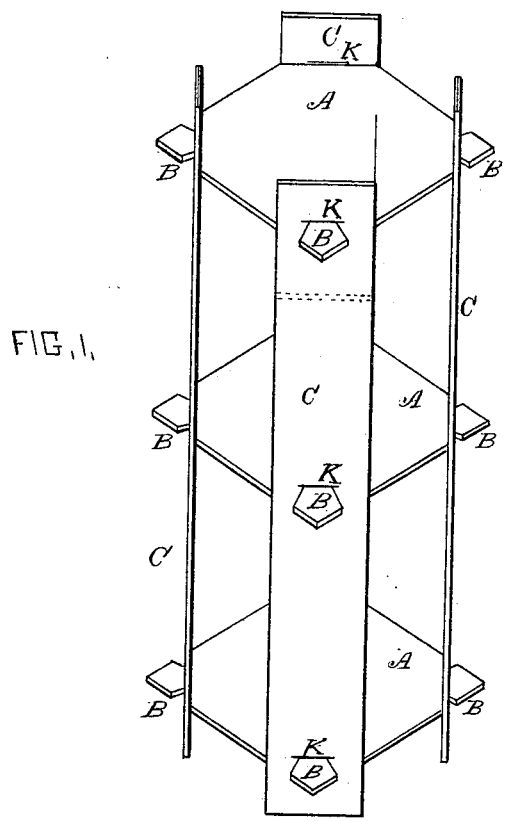
FIG. I.
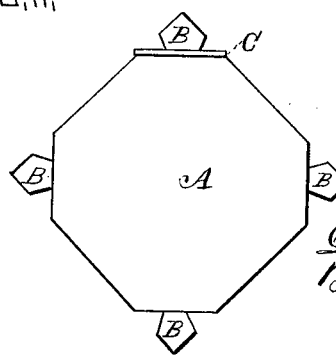
FIG. II.
Witnesses:
A. M. Frost
Adolf Heile
Inventor,
David Goodwillie.
By G. L. Chapin,
Atty.

UNITED STATES PATENT OFFICE.

DAVID GOODWILLIE, OF LAKE VIEW, ILLINOIS.

EGG-CARRIER.

SPECIFICATION forming part of Letters Patent No. 266,619, dated October 31, 1882.

Application filed March 6, 1882. (No model.)

*To all whom it may concern:*

Be it known that I, DAVID GOODWILLIE, of Lake View, county of Cook, and State of Illinois, have invented certain new and useful Improvements in Egg-Carriers, of which the following is a specification, reference being had to the accompanying drawings, illustrating the improvement, in which—

Figure I is a perspective representation of my improved egg-carrier; Fig. II, a plan or top view of one of the partitions removed.

The present invention consists of three or more thin narrow strips of wood, secured to straw-board partitions by means of spear-shaped locking-tenons, between which partitions, respectively, a single egg is put, the strips being held to the partitions in such a manner that any one egg may be removed and another egg put in its place, and the spaces between the strips being such as enable the light to expose to view the condition of the eggs.

The object of the invention is to provide a package which will safely hold for transportation any desired number of eggs—a dozen, more or less—in a single row, their ends coming opposite to each other. By this means eggs can be packed so as to reach the consumer without further counting, and be conveyed in ordinary boxes or barrels. If desired, the surplus spaces round the eggs may be filled with any light grains.

A A, &c., represent the partitions, which I find are better to be made of straw-board or like material, which is so tough that the tenons formed thereon will not break off in handling. On the angles of these partitions are formed spear-shaped locking-tenons B B B B, which, when the parts are put together to hold eggs, pass through mortises made transversely in the strips C C C C. In practice these strips are made by machinery, as are also the partitions, so cheaply as to be laid aside when the eggs have been used. The parts to form any desired number of packages are shipped directly to the producers or shippers, where all the strips but one are placed on the heads or partitions, the eggs put between the partitions, and the other strip placed on the locking-tenons, and the package is then placed in suitable barrels or boxes for shipment, care being taken to place the boxes so that the eggs will bear on their small ends.

I am aware that there are packages for holding tiers of eggs placed side by side; but I am not aware that a package for holding a single tier of eggs placed on end, one above the other, has heretofore been known or used.

I do not confine myself to the particular form of connections shown—that is, the spear-shaped tenons for uniting the partitions with the long strips—as other forms of locking connections may answer the purpose, although the form of tenons shown answers well the purpose.

I claim and desire to secure by Letters Patent—

A package or carrier for holding a tier of eggs placed on end, one above the other, consisting of the partitions A, provided with locking-tenons, substantially as shown, and combined with the strips C, provided with mortises K, as and for the purpose set forth.

DAVID GOODWILLIE.

Witnesses:
ADOLF HEILE,
G. L. CHAPIN.